United States Patent [19]

Oguri et al.

[11] 4,427,611
[45] Jan. 24, 1984

[54] PROCESS FOR PREPARING CALCIUM SILICATE SHAPED PRODUCT

[75] Inventors: Yasuo Oguri, Tokyo; Mitsuru Awata, Kodaira; Junji Saito, Machida; Soichi Inoue, Kawasaki; Tatsuo Andio; Mitsunobu Abe, both of Yokohama, all of Japan

[73] Assignee: Mitsubishi Chemical Industries Ltd., Tokyo, Japan

[21] Appl. No.: 433,995

[22] Filed: Oct. 13, 1982

Related U.S. Application Data

[63] Continuation of Ser. No. 227,697, Jan. 23, 1981, abandoned.

[30] Foreign Application Priority Data

Feb. 4, 1980 [JP] Japan .................................. 55-12161

[51] Int. Cl.$^3$ .............................................. C04B 7/34
[52] U.S. Cl. ...................................... 264/86; 106/120; 264/333
[58] Field of Search .................... 264/333, 86; 106/120

[56] References Cited

U.S. PATENT DOCUMENTS 3,231,657  1/1966  Kalousek .............................. 264/333
3,505,439  4/1970  Moorehead .......................... 264/333

FOREIGN PATENT DOCUMENTS 1043015  9/1966  United Kingdom ................ 264/333

Primary Examiner—John A. Parrish
Attorney, Agent, or Firm—Oblon, Fisher, Spivak, McClelland & Maier

[57] ABSTRACT

A calcium silicate shaped product is produced by forming an aqueous slurry of calcium silicate hydrate obtained by reacting a calcareous source with a siliceous source dispersed in water under heating; molding said aqueous slurry and heat-treating said molded product under the condition providing the equations (I) and (II);

$$100 \leq \theta \cdot T \quad (I)$$

$$50 \leq \theta \leq 300 \quad (II)$$

wherein $\theta$ represents a temperature of the inner part of the molded product (°C.) and T represents a time (hour) and providing a percent water loss of the treated molded product of less than 25 wt. %, before drying or steam-curing and drying the molded product.

20 Claims, No Drawings

PROCESS FOR PREPARING CALCIUM SILICATE SHAPED PRODUCT

This is a continuation of application Ser. No. 227,697, filed Jan. 23, 1981 abandoned.

BACKGROUND OF THE INVENTION

1. Field of the Invention

The present invention relates to a process for producing a calcium silicate shaped product. More particularly, it relates to a process for producing a calcium silicate shaped product which has low bulk density and excellent refractoriness, heat resistance, mechanical strength and dimensional stability and is suitable as a refractory coat, a heat insulator and a lagging product.

2. Description of the Prior Arts

Calcium silicate shaped products especially products made of xonotlite as a main component usually have heat resistance to a temperature of at least 1,000° C. to be suitable as a lagging product, a heat insulator and a refractory.

In usual, calcium silicate shaped products used for a lagging product, a heat insulator and a refractory should have low thermal conductivity and high mechanical strength. Such calcium silicate shaped products have been produced by reacting a calcareous source such as calcium oxide with a siliceous source such as a diatomaceous earth in the presence of water under heating to obtain an aqueous slurry and press filter-molding the aqueous slurry and drying the molded product or steam-curing and drying the molded product. If the molded product is steam-cured or dried just after the press filter-molding, cracks may be formed in the shaped product by suddenly releasing uneven pressure distribution and strain caused in the press filter-molding.

The inventors have studied the above-mentioned problem and have found that an excellent calcium silicate shaped product having no crack can be prepared in stable by a heat treatment under a specific condition before the steam-curing or drying of the molded product after the press filter-molding of the aqueous slurry.

SUMMARY OF THE INVENTION

It is an object of the present invention to provide a process for preparing a calcium silicate shaped product having low bulk density and high mechanical strength without cracks.

The foregoing and other objects of the present invention have been attained by producing a calcium silicate shaped product by forming an aqueous slurry of calcium silicate hydrate obtained by reacting a calcareous source with a siliceous source dispered in water under heating; molding said aqueous slurry; and heat-treating said molded product under the condition providing the equations (I) and (II):

$$100 \leq \theta \cdot T \quad \text{(I)}$$

$$50 \leq \theta \leq 300 \quad \text{(II)}$$

wherein $\theta$ represents a temperature of the inner part of the molded product (°C.) and T represents a time (hour) and providing a percent water loss of the treated molded product of less than 25 wt.% before drying or steam-curing and drying the molded product.

DETAILED DESCRIPTION OF THE PREFERRED EMBODIMENTS

In the process of the present invention, an aqueous slurry of calcium silicate hydrate preferably a tobermorite group compound having the below-mentioned wet volume of more than 15 cm$^3$/g is prepared by reacting a siliceous source with a calcareous source in water as an aqueous dispersion under heating it.

Suitable siliceous sources include natural sources such as diatomaceous earth, quartzite and silicon dust; silica obtained by reacting aluminum hydroxide with hexafluorosilicic acid as a by-product in a wet process for producing phosphoric acid (hereinafter referring to as a wet process phosphoric acid by-product silica) and other industrial by-product silica.

The siliceous sources can be amorphous or crystalline form. It is preferable to use an amorphous siliceous source such as diatomaceous earth, the wet process phosphoric acid by-product silica and silicon dust because a slurry of calcium silicate hydrate having the wet volume of more than 15 cm$^3$/g is easily obtained.

Suitable calcareous sources include quick lime, slaked lime, carbide waste and other known sources.

The mole ratio of the calcareous source to the siliceous source as CaO/SiO$_2$ is usually in a range of 0.8 to 1.2 in the case of xonotlite as the hydrated calcium silicate in the shaped product and it is usually in a range of 0.7 to 1.0 in the case of tobermorite as the calcium silicate hydrate in the shaped product.

The amount of water used for dispersing the siliceous source and the calcareous source is more than 15 times by weight especially 17 to 40 times by weight to the solid content. Various calcium silicate hydrates can be classified by the classification described in the Chemistry of Cements (Edited by H. F. W. Taylor, Department of Chemistry. University of Aberdeen, Scotland) Volume I P. 182, Table II.

In the process of the present invention, it is possible to use anyone of tobermorite group compounds such as tobermorite gel, C-S-H(II), C-S-H(I) and crystalline tobermorite and xonotlite. The calcium silicate hydrate causes the transformation in the order of tobermorite gel→C-S-H(II)→C-S-H(I)→11.3 Å tobermorite→xonotlite whereby suitable crystalline type can be easily obtained by controlling the reaction temperature and the reaction time in ranges of 80° to 230° C. and 30 minutes to 10 hours. The transformation of the crystalline type is caused to the arrow line (→) depending upon rising the reaction temperature or prolonging the reaction time. It is necessary to use tobermorite gel, C-S-H(I) or C-S-H(II) as the calcium silicate hydrate in an aqueous slurry if the crystalline tobermorite is desired as the crystal in the final shaped product.

In the process of the present invention, the calcium silicate hydrate in the aqueous slurry preferably has a wet volume of more than 15 cm$^3$/g.

The wet volume is calculated by the equation (III)

$$\text{wet volume} = V/W \quad \text{(III)}$$

wherein W represents a total weight of the calcareous source and the siliceous source and V represents a volume of solid components after 24 hours in a sedimentation of the aqueous slurry obtained by the reaction.

The wet volume is measured as follows. W$_1$ g of the aqueous slurry obtained by the reaction (W$_0$ g) is sampled and kept in stand-still for 24 hours and the volume ($V_1$ cm$^3$) of the sedimentated solid components is measured and the wet volume is calculated by the equation (IV);

$$\text{wet volume} = \frac{V_1}{W_1 \times \frac{W}{W_0}} \quad (IV)$$

wherein W represents a total weight of the equation (III).

In order to give the wet volume of more than 15 cm$^3$/g, the reaction is carried out at higher than 130° C. preferably 150° to 230° C. especially 160° to 210° C., under stirring. It is necessary to maintain the reaction system in a liquid condition whereby the reaction is carried out under higher pressure.

The resulting slurry is admixed with a reinforcing fibrous material and the mixture is molded by the press filter-molding. The reinforcing fibrous material can be incorporated before the preparation of the slurry. The temperature and pressure in the press filter molding are usually in ranges of 30° to 80° C. and 1 to 200 kg./cm$^2$ G and the bulk density of the molded product can be controlled by adjustment of piston stroke of the pressing machine.

Various reinforcing fibrous materials can be used. Suitable reinforcing fibrous materials include asbestos, rockwool and glass fiber. The reinforcing fibrous material is usually incorporated at a ratio of 0.5 to 10 wt.%.

The resulting molded product is heat-treated under the condition providing the equations (I) and (II);

$$100 \leq \theta \cdot T \text{ preferably } 100 \leq \theta \cdot T \leq 1{,}000 \quad (I)$$

$$50 \leq \theta \leq 300 \text{ preferably } 70 \leq \theta \leq 230 \quad (II)$$

wherein $\theta$ represents a temperature of the inner part of the molded product (°C.) and T represents a time (hour) and providing a percent water loss of the treated molded product of less than 25 wt.% preferably less than 10 wt.% especially less than 5 wt.%.

When the temperature of the inner part of the molded product used for the heat-treatment is lower than 50° C., the heat-treatment under the above-mentioned condition is carried out after pre-heating the molded product by a suitable heating device. When the temperature of the inner part of the molded product is higher than 50° C., it can be directly heat-treated or also can be heat-treated after heating it to a desired temperature of the inner part if necessary.

If excess of water is reduced from the molded product, the molded product is highly shrinked. Therefore, in the process of the present invention, it is preferable to use an apparatus having closing effect for presenting such adverse effect and having an outer jacket for indirectly heating it or having an inner heater. In the heat-treatment, a small amount of water can be added in the apparatus so as to control the percent water loss of the molded product.

In the process of the present invention, it is preferable to use an autoclave equipped with a heater etc. in the heat-treatment because the steam-curing can be carried out by following to the heat-treatment without any movement.

The molded product is cured under higher pressure by the steam curing, that is, the curing in an autoclave (induration).

In accordance with the steam curing, it is necessary to attain the transformation from tobermorite gel, C-S-H(I) or C-S-H(II) to crystalline tobermorite or xonotlite or from crystalline tobermorite to xonotlite. In accordance with the transformation of the crystalline form by the steam curing, the shaped product having low bulk density and excellent mechanical strength can be obtained.

The reaction time can be shortened by rising the steam pressure. The steam pressure is usually in a range of 5 to 50 kg./cm$^2$ G. and it is especially in a range of 12 to 40 kg./cm$^2$ G to obtain the shaped product of xonotlite and in a range of 6 to 30 kg./cm$^2$ G to obtain the shaped product of tobermorite.

The transformation is easily attained under these conditions. When a desired transformation was not attained, for example, tobermorite is formed even though xonotlite is expected, the desired transformation may be attained by rising the steam pressure or prolonging the steam curing time. When xonotlite is formed even though tobermorite is expected, the desired transformation may be attained by falling the steam pressure or shortening the steam curing time.

In the usage for requiring high heat resistance, it is preferable to transform into xonotlite. The product is further treated by the dry-treatment to obtain a desired calcium silicate shaped product.

In the case of the calcium silicate shaped product obtained by press-filter molding the aqueous slurry containing xonotlite, the product can be treated by the dry-treatment without any steam curing.

The process of the present invention has been illustrated in detail. In accordance with the present invention, it is possible to obtain a calcium silicate shaped product having no crack and having high bending strength of more than 5 kg./cm$^2$ at the bulk density of about 0.10 g./cm$^3$ more than 30 kg./cm$^2$ at the bulk density of about 0.30 g./cm$^3$ and more than 100 kg./cm$^2$ at the bulk density of 0.55 g./cm$^3$ which can have various shapes as a lagging material etc. with excellent dimension stability. The resulting calcium silicate shaped product has remarkably high thermal insulating property and has high refractoriness at the temperature of about 650° to 1,000° C. Accordingly, the calcium silicate shaped product can be used in various fields such as refractory insulators and construction substrates.

The present invention will be illustrated by certain examples which are provided for purpose of illustration only and are not intended to be limiting unless otherwise specified.

EXAMPLE 1

A slaking was carried out by adding hot water to 43.2 wt. parts of quick lime (98% of CaO) and 46.8 wt. parts of ground quartzite (97.0% of SiO$_2$; 1.2% of Al$_2$O$_3$ and 0.09% of Fe$_2$O$_3$) (manufactured by Tokai Kogyo Co., Ltd.) was added to the slaked lime and water was added to give 30 times by weight of water to the solid content. The resulting suspension was stirred in an autoclave at 200° C. under the pressure of 15 kg./cm$^2$ G for 2.5 hours to react them, whereby an aqueous slurry of the C-S-H(I) having the wet volume of 23 cm$^3$/g. was obtained. The aqueous slurry was admixed with 3 wt. parts of an alkali resistant glass fiber and the mixture was heated at 70° C. and shaped by a press filter-molding at 70° C. under a pressure of 5 kg./cm$^2$ in a size of 200 mm×200 mm×30 mm under controlling a feed of the slurry so as to give a bulk density of 0.10, 0.30 or 0.55 g./cm$^3$. Each resulting molded product was heat-treated in the atmosphere at 70° C. for 3 hours. A percent water loss caused by the heat treatment was 5 wt.%.

Each resulting heat treated-molded product was cured with steam in an autoclave at 180° C. under a pressure of 10 kg./cm² G. for 7 hours and then, dried at 150° C. for 8 hours.

The resulting shaped products had not any crack and had each bulk density of 0.10, 0.30 or 0.55 g./cm³. The sizes of the products were the same as the sizes of the molded product formed by the press filter molding. The resulting shaped products had each bending strength of 6.3, 38 or 100 kg./cm². The crystal was identified to be xonotlite.

REFERENCE 1

In accordance with the process of Example 1, the molded product obtained by the press filter molding was steam-cured in an autoclave at 180° C. under a steam pressure of 10 kg./cm² G. for 7 hours without the heat treatment, and the molded product was dried at 150° C. for 8 hours. The resulting shaped product had the same bending strength as the product of Example 1, but had cracks on the side surface of the shaped product. The crystals were identified as xonotlite.

EXAMPLE 2

The aqueous slurry obtained by the process of Example 1 was used to control the amount so as to give a bulk density of 0.10 g./cm³ and was press filter molded to form a lagging product for pipe-cover having an inner diameter of 90 mm, an outer diameter of 170 mm and a thickness of 40 mm at 70° C. under a pressure of 5 kg./cm².

The molded product was heated in a heating apparatus to raise a temperature of the inner part of the molded product from 70° C. to 95° C. and to maintain the temperature for 2 hours in the heat-treatment. After the heat treatment, the molded product was charged in an autoclave and steam-cured at 200° C. under a pressure of 15 kg./cm² G for 4 hours and then, was dried at 150° C. for 8 hours. The resulting shaped product had a bulk density of 0.1 g./cm³. The crystal was identified to be xonotlite. The size was the same as the size of the molded product obtained by the press filter-molding. The shaped product had not any crack.

REFERENCE 2

The molded product obtained by the press filter molding of Example 2 was heated in a heating apparatus from 70° C. to 80° C. and heat-treated at 80° C. for 1 hour.

After the heat treatment, the molded product was steam-cured and dried in accordance with the process of Example 2.

The resulting shaped product had the increased thickness for 2 mm by increasing from 40 mm to 42 mm and had small cracks along the edges. The phenomenon was the same as that of non-heat-treatment.

EXAMPLE 3

The aqueous slurry obtained by the process of Example 1 was used to control the amount so as to give a bulk density of 0.10 g./cm³ and was press filter-molded to form a lagging product for pipe-cover having an inner diameter of 74 mm, an outer diameter of 204 mm and a thickness of 65 mm at 70° C. under a pressure of 5 kg./cm².

The molded product was heated in a heating apparatus to raise a temperature of the inner part of the molded product from 70° C. to 80° C. and to maintain the temperature of 80° C. for 5 hours in the heat-treatment. After the heat treatment, the molded product was charged in an autoclave and steam-cured at 180° C. under a pressure of 10 kg./cm² G for 7.5 hours and then, was dried at 130° C. for 12 hours. The resulting shaped product had a bulk density of 0.10 g./cm³. The crystal was identified to be xonotlite. The size was the same as the size of the molded product obtained by the press filter molding. The shaped product had not any crack.

EXAMPLE 4

The aqueous slurry obtained by the process of Example 1 was used to control the amount so as to give a bulk density of 0.10 g./cm³ and was press filter-molded to form a lagging product for pipe-cover having an inner diameter of 74 mm, an outer diameter of 204 mm and a thickness of 65 mm at 60° C. under a pressure of 5 kg./cm². The molded product was charged in an autoclave equipped with a fine tube heater in the inner part and heated by the heater to carry out the heat treatment at 75° C. for 8 hours and then, steam was fed to carry out the steam-curing at 180° C. under a pressure of 10 kg./cm² for 7.5 hours and then, the product was dried at 130° C. for 12 hours. The resulting shaped product had a bulk density of 0.10 g./cm³. The crystal was identified to be xonotlite. The size was the same as the size of the molded product obtained by the press filter-molding. The shaped product had not any crack.

We claim:

1. A process for producing a shaped calcium silicate product, comprising:
   (a) forming an aqueous slurry of calcium silicate hydrate obtained by heating and reacting a calcareous source with a siliceous source in water as a dispersion;
   (b) molding said aqueous slurry into a shaped object;
   (c) heat treating said molded product under the conditions specified by the relationships (I) and (II):

$$100 \leq \theta \cdot T \quad (I)$$

$$50 \leq \theta \leq 300 \quad (II)$$

wherein $\theta$ represents the temperature (°C.) of the interior of said molded product and T represents the time (hrs), with the proviso that the amount of water loss during said heat treatment is less than 25 wt.%;
   (d) optionally steam curing said treated product; and
   (e) drying the cured product.

2. The process of claim 1, wherein said aqueous slurry contains a calcium silicate hydrate of the tobermorite structure having been reacted at a temperature of greater than 130° C. and having a wet volume of more than 15 cm³/g as defined by the equation:

$$\text{wet volume} = V/W,$$

wherein W represents the total weight of the calcareous source and the siliceous source and V represents the volume of the solid components after the aqueous slurry has settled for 24 hours.

3. The process of claim 1, wherein said aqueous slurry of calcium silicate hydrate is admixed with a reinforcing fibrous material and the resulting mixture is molded by press filter-molding and cured.

4. The process of claim 1, wherein said aqueous slurry of calcium silicate hydrate is prepared by mixing the siliceous source and the calcareous source with a reinforcing fibrous material and heating the resulting mixture in water followed by completing the preparation of said molded product by press filter-molding said aqueous slurry and curing the molded product.

5. The process of claim 1, wherein the reaction of the siliceous source and the calcaerous source is conducted at a temperature of 150° to 230° C.

6. The process of claim 1, wherein the heat treating conditions of step (c) are defined by the relationships (I') and (II'):

$$100 \leq \theta \cdot T \leq 1,000 \quad (I')$$

$$70 \leq \theta \leq 230 \quad (II')$$

7. The process of claim 1, wherein said heat treatment of step (c) is conducted under the provisions in which less than 10 wt.% of the water is removed.

8. The process of claim 1, wherein said heat treatment of step (c) is conducted under the provisions in which the amount of water removed is less than 5 wt.%.

9. The process of claim 1, wherein the steam pressure during steam curing of the molded and heat treated product is conducted at a pressure ranging from 5 to 50 kg/cm² G.

10. The process of claim 1, wherein the steam pressure during steam curing of the molded and heat treated product is conducted at a pressure ranging from 6 to 30 kg/cm² G.

11. A process for producing a shaped calcium silicate product, comprising:
  (a) forming an aqueous slurry of calcium silicate hydrate obtained by heating and reacting a calcareous source with a siliceous source in water as a dispersion;
  (b) molding said aqueous slurry into a shaped object;
  (c) heat treating said molded product under the conditions specified by the relationships (I) and (II):

$$100 \leq \theta \leq \cdot T \quad (I)$$

$$50 \leq \theta \leq 300 \quad (II)$$

wherein $\theta$ represents the temperature (°C.) of the heat treatment and T represents the time (hrs) of heat treatment, with the proviso that the amount of water loss during said heat treatment is less than 25 wt.%;
  (d) optionally steam curing said treated product; and
  (e) drying the cured product.

12. The process of claim 11, wherein said aqueous slurry contains a calcium silicate hydrate of the tobermorite structure having been reacted at a temperature of greater than 130° C. and having a wet volume of more than 15 cm³/g as defined by the equation:

$$\text{wet volume} = V/W,$$

wherein W represents the total weight of the calcareous source and the siliceous source and V represents the volume of the solid components after the aqueous slurry has settled for 24 hours.

13. The process of claim 11, wherein said aqueous slurry of calcium silicate hydrate is admixed with a reinforcing fibrous material and the resulting mixture is molded by press filter-molding and cured.

14. The process of claim 11, wherein said aqueous slurry of calcium silicate hydrate is prepared by mixing the siliceous source and the calcareous source with a reinforcing fibrous material and heating the resulting mixture in water followed by completing the preparation of said molded product by press filter-molding said aqueous slurry and curing the molded product.

15. The process of claim 11, wherein the reaction of the siliceous source and the calcareous source is conducted at a temperature of 150° to 230° C.

16. The process of claim 11, wherein the heat treating conditions of step (c) are defined by the relationships (I') and (II'):

$$100 \leq \theta \cdot T \leq 1,000 \quad (I')$$

$$70 \leq \theta \leq 230 \quad (II')$$

17. The process of claim 11, wherein said heat treatment of step (c) is conducted under the provisions in which less than 10 wt.% of the water is removed.

18. The process of claim 11, wherein said heat treatment of step (c) is conducted under the provisions in which the amount of water removed is less than 5 wt.%.

19. The process of claim 11, wherein the steam pressure during steam curing of the molded and heat treated product is conducted at a pressure ranging from 5 to 50 kg/cm² G.

20. The process of claim 11, wherein the steam pressure during steam curing of the molded and heat treated product is conducted at a pressure ranging from 6 to 30 kg/cm² G.

* * * * *